United States Patent [19]

Spann et al.

[11] Patent Number: 5,532,816
[45] Date of Patent: Jul. 2, 1996

[54] LASER TRACKING WHEEL ALIGNMENT MEASUREMENT APPARATUS AND METHOD

[75] Inventors: Kyle T. Spann, Sterling Heights; Peter G. Karcz, Farmington Hills, both of Mich.

[73] Assignee: Stellar Industries, Inc., Madison Heights, Mich.

[21] Appl. No.: 213,120

[22] Filed: Mar. 15, 1994

[51] Int. Cl.[6] ............................. G01B 11/26; B01C 1/00
[52] U.S. Cl. .................... 356/139.09; 33/203.19; 33/203.2; 356/152.3
[58] Field of Search ............... 356/152.3, 139.03, 356/139.09; 33/203.19, 203.16, 203.2, 203.18

[56] References Cited

U.S. PATENT DOCUMENTS

| 4,349,965 | 9/1982 | Alsina. | |
|---|---|---|---|
| 4,457,075 | 7/1984 | Murata | 33/203.15 |
| 4,714,339 | 12/1987 | Lau et al.. | |
| 4,745,469 | 5/1988 | Waldecker et al.. | |
| 4,790,651 | 12/1988 | Brown et al.. | |
| 4,863,266 | 9/1989 | Masuko et al.. | |
| 4,866,362 | 9/1989 | Parker et al.. | |
| 4,899,218 | 2/1990 | Waldecker et al.. | |
| 4,955,716 | 9/1990 | Martin. | |
| 5,048,954 | 9/1991 | Madey et al.. | |
| 5,054,918 | 10/1991 | Downing et al. | 33/203.11 |
| 5,074,048 | 12/1991 | Yokomizo et al. | 33/203.13 |
| 5,268,731 | 12/1993 | Fuchiwaki et al.. | |

FOREIGN PATENT DOCUMENTS

| 3205254 | 9/1983 | Germany | 33/203.18 |

*Primary Examiner*—Stephen C. Buczinski
*Attorney, Agent, or Firm*—Brooks & Kushman

[57] ABSTRACT

The method of the present invention includes the steps of locating a single point on the wheel, rotating the wheel about its central axis of rotation, tracking the position of the single point in three dimensional space while the wheel is in a natural loaded driving condition and generating a signal directly representative of the actual rotational plane of the wheel. The generated signal may then be compared to an electronically stored mathematical model to determine wheel alignment conditions. The method of the present invention may be conducted on all four wheels simultaneously by separate tracking units each operatively positioned to track a single wheel.

27 Claims, 5 Drawing Sheets

LASER TRACKING WHEEL ALIGNMENT MEASUREMENT APPARATUS AND METHOD

TECHNICAL FIELD

This invention relates to vehicle wheel alignment measurement systems and, more particularly, to a wheel alignment measurement apparatus and method for determining vehicle wheel position through the use of a laser.

BACKGROUND ART

With the advent of more fuel efficient automobiles and the desire to improve quality, the automotive industry has become increasingly interested in improvement of wheel alignment measurement systems. In particular, the desire to provide wheel alignment measurement systems that are highly accurate yet utilize minimal time to operate and require minimal maintenance has risen in importance.

Conventional wheel alignment measurement systems utilize various direct contact measuring devices. These systems use conventional tools or adapters which locate to the wheels or spindles or other features of the rotating tire or wheel assembly and often rely on empirical or interpretative evaluation to predict alignment values. These systems are cumbersome, bulky and time consuming to operate. They also suffer from various problems associated with mechanical devices. The problems are often related to the difficulty in obtaining accurate measurements due to the variations in tire and/or wheel size, variations in tire type and inflation, variations in vehicle weight and wheel base, and variations in vehicle drive method and placement of the inspection apparatus. In addition, wear of the testing system apparatus over extended periods of use and distortions of the actual tire profile caused by the direct contact of the measuring tools adds to the unreliability and inaccuracy of the present direct measurement devices.

In addition, wheel alignment systems should also be utilized in the continuous preventative maintenance programs of automotive vehicles on the road. It is known that vehicle wheel alignment is detrimentally effected by collisions with other vehicles, contact with street curbs or speed bumps, and travel over pot holes. As such, a wheel alignment measurement system should allow for recalibration and realignment of the wheels to the initial alignment specifications determined in the manufacturing process. Thus, the preventative maintenance provider or service station should also have an accurate alignment measurement system which is capable of measuring wheel alignment to assist in bringing the wheel alignment back to the original manufacturing specifications.

U.S. Pat. No. 4,745,469 issued to Waldecker and U.S. Pat. No. 4,899,218 also issued to Waldecker, both disclose the use of a non-contact, vehicle wheel alignment apparatus which uses a structured light source. More specifically, the Waldecker systems utilize an optically-fanned laser light source to project at least two structured light beams onto one tire while the tire wheel assembly is being rotated. Contour lines are formed by these fanned laser light sources and are projected onto the tire and are thereby read by a video camera with an associated sensor module. The video camera takes multiple optical pictures of readings which are subsequently interpreted by the sensor modules. The sensor modules are offset from the optical plane of the structured light sources to allow triangulation with respect to the tire and laser light source to determine the spatial position of the contour lines.

Similar to geometric alignment measuring methods, the Waldecker system measures relative locations of two or three points on a tire sidewall to determine an indirect rotational plane. As the tire rotates, sets of measurements are taken several times per rotation. The measurements are then mathematically manipulated in an attempt to eliminate errors caused by various phenomena such as run-out, varying tire pressure, offset between the measured plane and the true alignment plane, etc. The Waldecker system does not track a single point fixed in reference to the true spindle axis throughout a single wheel rotation or directly measure, in a common coordinate system, the position and/or angles of the rotational planes of the wheels to be tested.

U.S. Pat. No. 5,048,954 issued to Madey discloses a laser-based wheel alignment measurement system. The Madey wheel alignment system utilizes a low power visible laser which is split into two generally parallel beams by a partially transmitting mirror and a series of plane front surface mirrors positioned in front and alongside the vehicle being serviced. The two beams are reflected from a set of mirrors attached to the rims of the particular vehicle wheels that are being aligned. The vertical and horizontal angles of each of the wheel-mounted mirrors are set by calibrated lead screws to cancel the angular displacement of the wheels expected when the wheels are properly aligned. The reflected beams are imaged through a large aperture beam combiner on a common viewing screen. Required tow-in and camber measurements are indicated when the laser beams reflected from the wheel-mounted mirrors overlap at the center of the viewing screen.

SUMMARY OF THE INVENTION

The present invention provides a simplified, highly accurate, efficient vehicle alignment method capable of directly measuring the natural rotational plane of a rotating wheel under a loaded driving condition.

The method of the present invention includes the steps of locating a single point on the wheel, rotating the wheel about its central axis of rotation, tracking the position of the single point in three dimensional space while the wheel is in a natural loaded driving condition and generating a signal directly representative of the actual rotational plane of the wheel. The generated signal may then be compared to an electronically stored mathematical model to determine wheel alignment conditions. The method of the present invention may be conducted on all four wheels simultaneously by separate tracking units each operatively positioned to track a single wheel.

More specifically, the apparatus of the present invention comprises a base including vehicle restraints, a plurality of electrically-driven dual roller drums, a plurality of independent laser tracking units, wheel attachments for mounting the tracking device to the wheels, a steering wheel level sensor and a central computer system which can provide vehicle wheel alignment values. The laser tracking units, in combination with the wheel-mounted tracking devices, are capable of measuring the planes of rotation of all of the vehicle's wheels simultaneously while the wheels are rotating, either in a stationary mode or a driving mode.

It is an object of the present invention to provide a wheel alignment measurement method which operates in real-time and provides an operator with real-time, continuous updated information for use in correction of wheel alignment defects.

It is a further object of the present invention to provide a wheel alignment measurement method which provides a highly accurate three-dimensional depiction of the rotational plane of the wheel determined from measurements taken from a single point on the rotating wheel.

It is yet another object of the present invention to provide a wheel alignment measurement method which provides wheel alignment information for four separate wheels of the same vehicle simultaneously.

It is yet still another object of the present invention to provide a wheel alignment method which provides highly accurate wheel alignment information with only a minimal amount of wheel rotation.

It is still yet a further object of the present invention to provide a wheel alignment method which directly locates the rotational planes of each wheel within a common cartesian coordinate system.

It is still yet another object of the present invention to provide a wheel alignment method which provides wheel alignment information while the entire vehicle is moving.

Other objects, advantages and features of the present invention will become apparent from the following detailed description, which, taken in conjunction with the attached drawings, discloses the preferred embodiments of the invention.

BEST MODE FOR CARRYING OUT THE INVENTION

Figure 1:
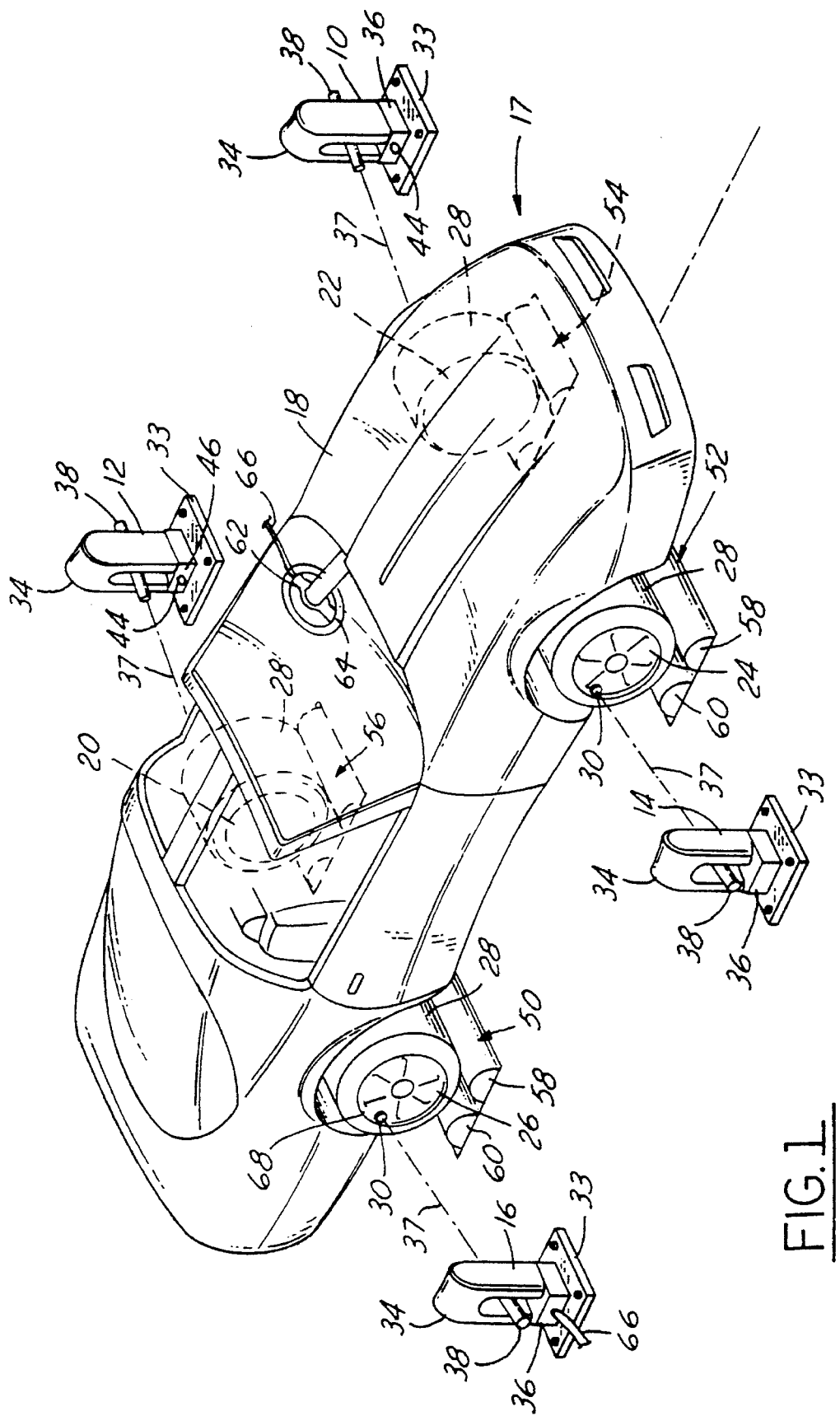
FIG. 1 is a perspective view of the wheel alignment measurement system of the present invention shown in conjunction with a motor vehicle operatively positioned adjacent four laser tracking units.

Referring now to FIG. 1, there is shown a plurality of laser tracking units of the present invention, designated by reference numerals 10, 12, 14 and 16; respectively, within an audit station 17. A vehicle 18 is shown operatively located between the laser tracking units. The exemplary vehicle 18 includes four wheels designated by reference numerals 20, 22, 24 and 26. Each wheel includes a respective elastomeric tire 28. Typically, the wheels are made from steel or aluminum and the tires are made from rubber of a similar material.

A reflective device (or "retro-reflector") 30 is positioned on wheel 26. Another retro-reflector 30 is affixed on wheel 24. Similar retro-reflectors (not shown) are also affixed to wheels 20 and 22 which are hidden by the vehicle 18 in FIG. 1. The wheel alignment system illustrated in FIG. 1 describes one embodiment of the present invention wherein the vehicle wheel alignment is monitored while the vehicle is in a stationary position.

Figure 2:
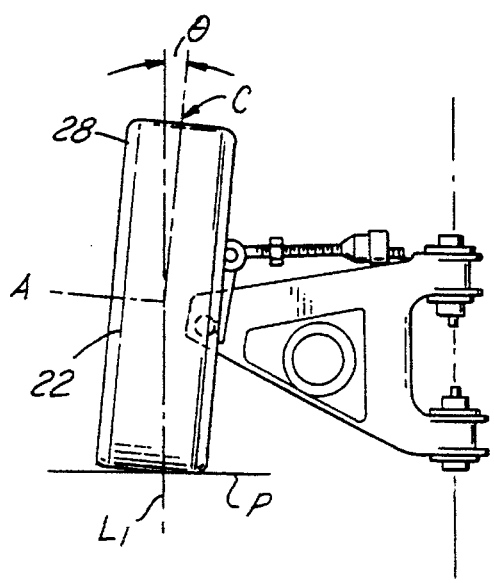
FIG. 2 illustrates a wheel and tire assembly useful in explaining tow-in alignment.

A description of two of the common wheel alignment measurements, "tow-in" and "camber", follows for use in describing the measuring characteristics of the present invention. For exemplary purposes, reference is made to FIG. 2 to describe the tow-in alignment relationship of a vehicle steering system. In describing tow-in measurements, the position of wheel 22 and tire 28 can be described in relation to a first longitudinal line L1 and a perpendicular line P. Line L1 is parallel to the longitudinal axis of the vehicle on which the wheel is positioned. Line L1 is also parallel to the direction of travel of the vehicle when it is proceeding in a straight path along a roadway. Line P is perpendicular to line L1 and also perpendicular to the direction of travel of the vehicle in a straight line. Line C is representative of the central longitudinal axis of the wheel with respect to the rotational wheel axis A. Lines C and A are perpendicular to one another. Angle θ between lines L1 and C establishes the "tow-in" position or reading of the wheel. Angle θ in FIG. 2 illustrates a positive (+) wheel tow-in condition. Different wheel positions which would position the central axis C counterclockwise of the longitudinal line L1 in FIG. 2 would yield a negative (−) tow-in.

Figure 3:
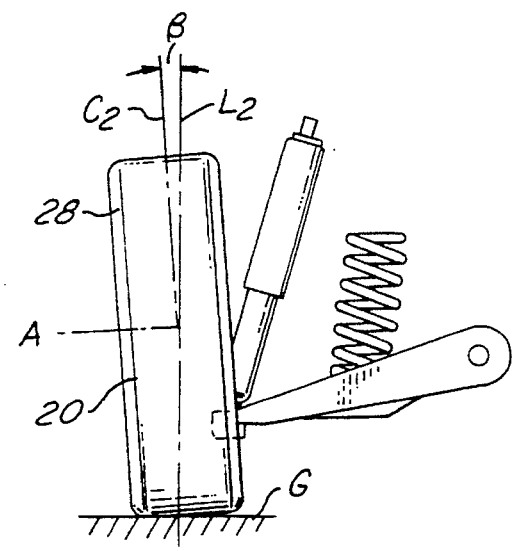
FIG. 3 illustrates a wheel and tire assembly useful in explaining camber alignment.

With reference to FIG. 3, which concerns the camber measurement, there is shown a rear wheel 20 and tire 28 of a typical vehicle. Line G is representative of the ground. Line L2 is a line perpendicular to the ground G. Line C2 is representative of the center plane or axis of the wheel which is perpendicular to the rotational axis A of wheel 20. The angle β between lines C2 and L2 establishes the wheel camber. As such, a positive (+) wheel camber is illustrated in FIG. 3. A negative (−) wheel camber would result if line C were positioned clockwise of line L2.

The present invention provides an apparatus and method for not only measuring the above-referenced conditions, but other wheel and vehicle steering conditions such as thrust angles, vehicle symmetry, actual wheel base, steering rate curves, steering wheel position and other values such as castor angle. The references to the tow-in and camber measurements are simply for illustrative purposes in order to highlight the operation and benefit of the present invention.

Figure 4:
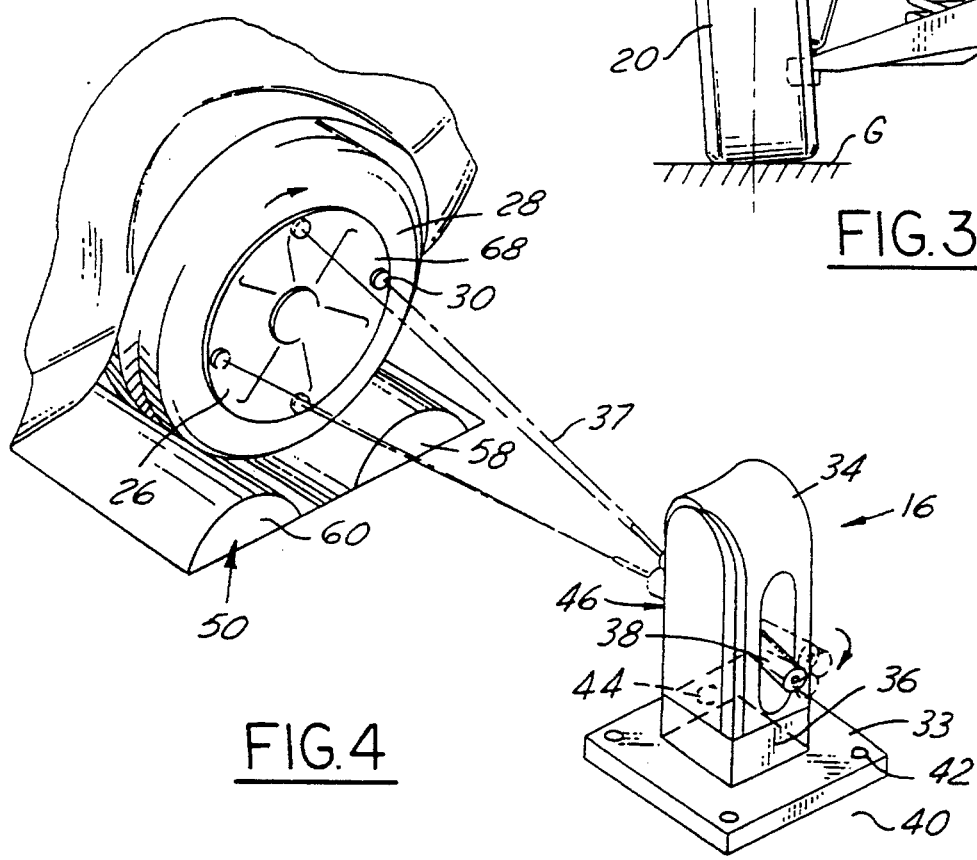
FIG. 4 is a perspective view of a laser tracking unit and a reflective device affixed to a wheel in accordance with the present invention showing the wheel rotating and the laser aiming device following the path of rotation.

Referring now to FIGS. 1 and 4, attention is turned to the apparatus necessary for carrying out the method of the present invention. A first method of the present invention is directed for use with a vehicle located in a stationary position. Vehicle 18 is shown disposed adjacent four laser tracking units 10, 12, 14 and 16. Each laser tracking unit includes a base 33, a housing 34, a laser light source 36, and a central aiming device 38. The base is preferably stabilized or fixed to the floor 40 or ground through the use of conventional fasteners 42. The fasteners are preferably attached directly to the floor 40.

A laser receiver 44 is affixed to the front portion 46 of the tracking unit base 33. The preferred laser tracking unit of the present invention is described operationally and structurally in more detail in U.S. Pat. No. 4,790,651 to Brown, the subject and disclosure of which is herein incorporated by reference.

For illustrative purposes, the structure and operation of one of the laser tracking units will be described (with reference to unit 16 shown in FIGS. 1 and 4 concerning wheel 26), but it is understood that such descriptions apply similarly to the other units used in association with vehicle 18 and the other wheels.

For use in describing the present invention, a summary of the operation of the laser tracking device is provided. The laser tracker light source 36 emits a beam of laser light 37 through a central aiming device 38. The device 38 is universally pivoted to be movable in the horizontal and vertical directions. The central aiming device 38 is pointed toward the retro-reflector 30 and the target 30 reflects the laser light beam 37 back toward unit 16 where it is received by laser receiver 44.

Figure 8:
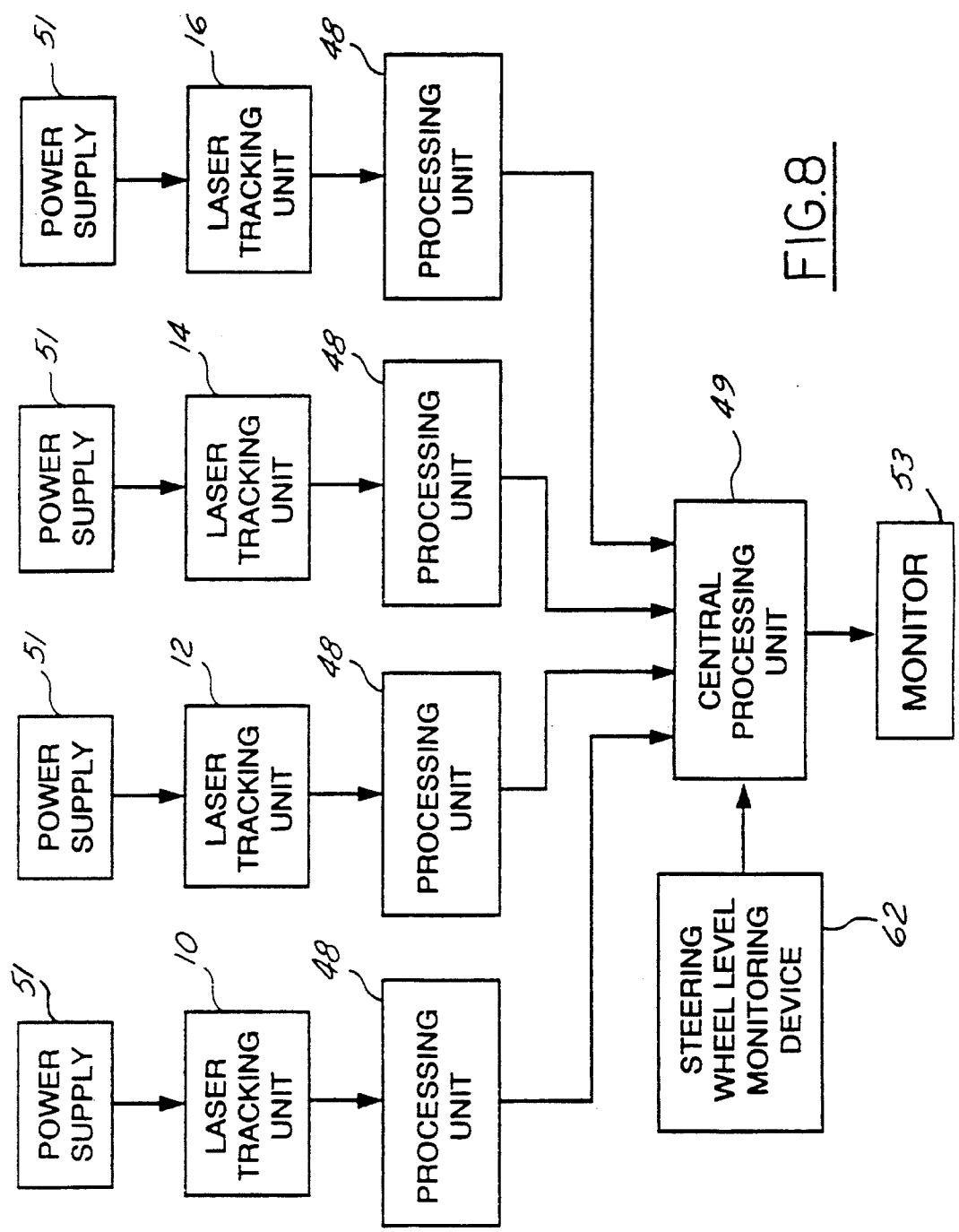
FIG. 8 is a block diagram schematically illustrating the interconnection of the laser tracking units to the computer processing unit.

The information received by receiver 44 operates as a laser interferometer and therefore measures the linear distance to the retro-reflector. Two angular encoders (not shown) measure the azimuth (horizontal) and elevational (vertical) angles of the laser beam as it returns to the receiver. With this information, the position of the retro-reflector in spherical coordinates may be converted to cartesian coordinates (X, Y and Z) by the computer processing unit 48. Computer 48 is preferably a 486 MS-DOS based computer. Each of the laser units 10, 12, 14 and 16 is connected directly to a computer processing unit 48 as shown in FIG. 8. Each computer processing unit is, in turn, connected to a central processing unit 49. The central processing unit 49 receives information from each processing unit 48 and, in turn, provides an output signal to monitor 53. Monitor 53 provides real-time wheel alignment and steering conditions to the operator.

Figure 9:
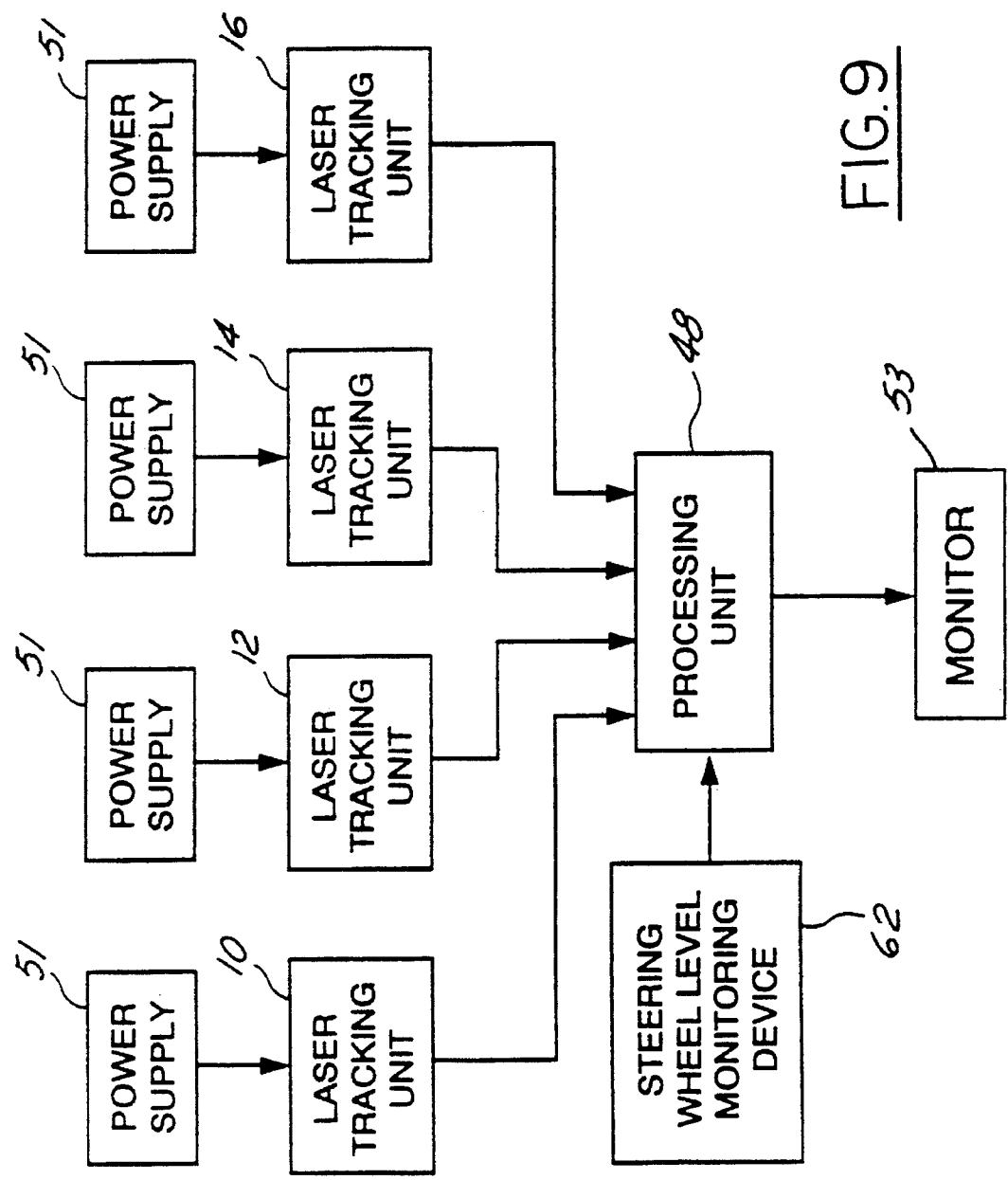
FIG. 9 is a block diagram schematically illustrating an alternative interconnection of the laser tracking units to multiple computer processing units.

An alternative embodiment of the present invention is disclosed in FIG. 9. In this embodiment, the signals from each laser tracking unit 10, 12, 14 and 16 is fed into one processing unit 48. Processing unit 48 would preferably include a 8486 Intel real-time multitracking operating system capable of operating each laser tracking unit independently. Processor unit 48, as shown in FIG. 9, would operate in all other aspects, as central processing unit 49, as described above.

Each laser tracking unit is powered by a remote power unit 51 which may be located a distance from the laser tracking unit. Each laser tracking unit of the present invention, in the preferred embodiment, provided by Chesapeake Laser Systems, Inc. of Maryland.

Referring now to. FIG. 1, as shown, all laser tracker units are substantially identical, as are all retro-reflectors 30 which are affixed to the wheels 20, 22, 24 and 26. In the stationary vehicle type station depicted in FIG. 1, and also in the moving vehicle type system disclosed in FIG. 8, all laser tracking units are preferably initially calibrated prior to any monitoring operation.

Figure 5:
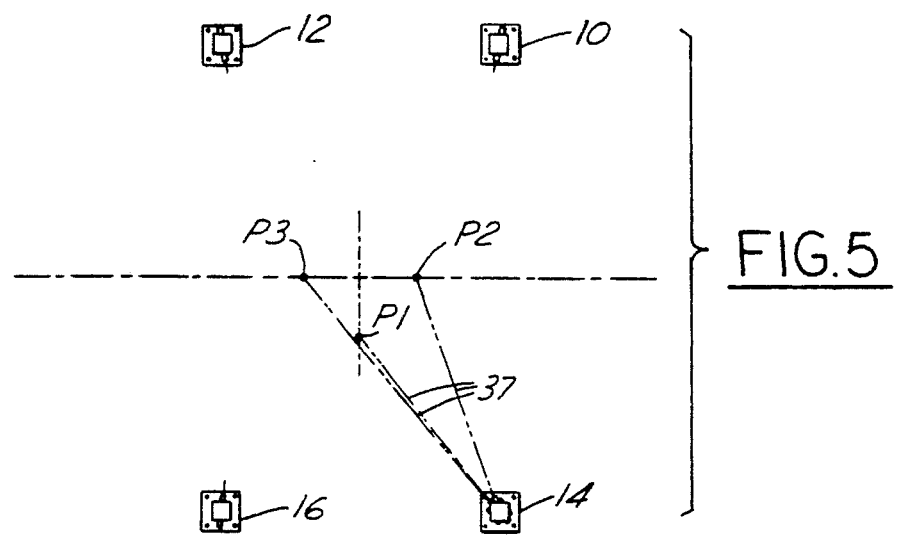
FIG. 5 is a diagrammatical view of one embodiment of the present invention illustrating a laser tracking unit being calibrated to a common coordinate system.

Referring now to FIG. 5, there is shown an exemplary calibration technique for laser tracking unit 14. The laser tracking unit is preferably calibrated to a common primary coordinate system which contains the secondary cartesian system of the vehicle. While laser tracking unit 14 is operational, the unit must initially locate the position of retro-reflector 30. This initial location activates the tracking system of the laser tracking unit 14. The retro-reflector 30 is next manually moved to each of the three predetermined points P1, P2 and P3 by an operator.

It should be understood that these three calibration points, P1, P2 and P3, may be located in any position within the laser tracking directional parameters of each of the laser tracking units, 10, 12, 14 and 16. In some stationary vehicle type stations it is contemplated that a pit (not shown) may be disposed below the vehicle for use in accessing all four wheels of a vehicle to afford the operator instantaneous, real-time corrections of the wheel specifications in accordance with calibration information received from the tracking system of the present invention.

Figure 6:
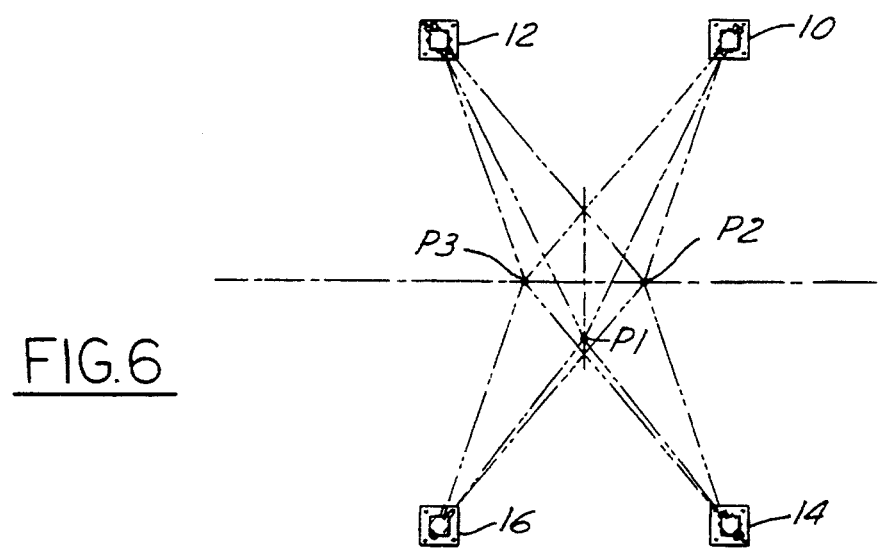
FIG. 6 is a diagrammatical view similar to FIG. 5 except showing four laser tracking units of the present invention being calibrated to the same common coordinate system.

Referring now to FIG. 6, each additional laser tracking unit 10, 12 and 16 is also calibrated to the identical same predetermined points P1, P2 and P3. In this manner, all four tracking units are calibrated interrelationally to the same common coordinate system. Once each laser tracking unit is calibrated in this manner, it is preferred that they not be moved.

After calibration of the four laser tracking units has been completed, in the stationary vehicle type system, an operator drives the vehicle 18 into the audit station 17. The audit station 17 includes four independently-driven dual roller drum units 50, 52, 54 and 56 of conventional type. The drum units are operatively located with respect to each other to cooperate with the position of the respective wheels of the vehicle to be tested. Each dual roller drum unit includes a pair of rollers 58 and 60, and is configured to be initially free floating in a horizontal direction to self-align with the natural alignment of each respective tire. Each roller drum unit is also adapted to be set in a locked position to allow the vehicle to be driven initially upon the roller drum units.

In addition, the audit station 17 includes vehicle restraints (not shown) which are well known and operate to restrain the vehicle from any fore/aft and side-to-side motion. Also, after the operator has driven the vehicle onto the respective four roller drum units, a steering wheel level monitoring device 62 is positioned on the steering wheel 64 of the vehicle. The steering wheel movement measurement device is electronically connected to the system computer 48 by conventional electrical connection 66, as shown in FIG. 8. The steering wheel level measurement device is commercially available and provides information to the system computer related to the position of the steering wheel in relation to the actual movement (and resulting positions) of the wheels of the vehicle.

The retro-reflectors 30 for the laser tracking units 10, 12, 14 and 16 are positioned onto the outer rim position 68 of each respective wheel. The placement of the retro-reflectors on the wheels should be offset from the central axes of rotation of the wheels. This allows for more accurate measurements. The retroreflectors 30 can be affixed or releasably affixed to each wheel by hand before or after the vehicle is positioned in the audit station 17 and on the drum units.

Any conventional means for temporarily affixing retro-reflectors 30 to the metal wheels can be used, such as glue, Velcro, and the like. Alternatively, retro-reflectors could be permanently molded or cast into the wheels when they are manufactured. Additionally, it is contemplated that the retro-reflector may be directly affixed to a lug nut of the wheel (not shown) or be integrally connected to a lug nut of the wheel.

The vehicle restraint system is next actuated and the vehicle restraints restrain the vehicle from fore/aft and side-to-side motion. The initial locking of the roller drum assemblies is deactivated and the floating drum units self-align in the horizontal plane with respect to each wheel. The roller drum units 50, 52, 54 and 56 are then activated and the respective wheels begin to rotate. The respective aiming devices 38 on each of the laser tracking units follow the paths of the respective wheels through cooperation of the retro-reflectors 30 and receiving devices 44. The signals from the retro-reflectors 30 are received by the receiving devices 44 and are converted through the use of the system computer 48 to cartesian coordinates. These coordinates represent the actual, natural planes of rotation of each respective wheel under the natural driving loaded conditions.

In operation, an operator also moves the steering wheel 64 in both the clockwise and counterclockwise directions to obtain the necessary movement of the wheels 22 and 24 in relation to each other and the steering wheel 64. This movement is monitored by the steering wheels level monitor device 62 and is used in conjunction with the other direct measurements to obtain steering wheel condition measurements.

The rotational plane generated by the present invention provides exact dimensions of the rotation plane directly without any intervening interpretation in a common coordinate system. In this way, the tow-in and camber are directly measured. The generated rotational planes for each wheel are also used to calculate the thrust angle symmetry, scrub angles, castor angles, steering linkage rates and steering wheel centers for each wheel. Each wheel rotation provides at least two complete rotational plane measurements in real-time which may be used to determine various wheel alignment conditions.

In contrast to the systems disclosed in U.S. Pat. Nos. 4,745,469 and 4,899,218, which utilize master vehicles and compare all subsequent vehicle information to the master, the present invention provides real-time natural rotational plane information for each vehicle individually. This information is derived from the tested wheels in a naturally loaded, driven state, which is then compared to a mathematical model preprogrammed into the alignment measurement system from detailed manufacturers data.

In addition, the present invention does not require high RPMs or prolonged operation to obtain the required four rotational planes. Measurements may be obtained in less than one rotation of the wheel. Depending on how far the retro-reflector 30 is placed off-center of the rotational axis of each respective wheel, a very small rotation of as little as 2° may be used to calculate accurate angle measurements of the rotational plane information, although higher degrees of rotation up to 270° will produce the most accurate calculations of the rotational planes. This is in direct contrast to the prior art systems which require the wheels to be rotated up to 20 miles per hour or more, in order to secure angle calculations requiring full rotations for accurate error compensation.

The present invention is highly accurate because the retro-reflector 30 is placed directly on the wheel of the vehicle in contrast to placement of prior art systems on the inflated tire. It is known that measurement of the tire of the vehicle is affected by varying tire conditions such as tire and wheel run-out. Tire and wheel run-out is described as an informality, bump or dip on the side of the tire that is not a flat consistent section. As such, upon rotation of this informality, inaccuracies occur with respect to the actual spatial position of the tire and therefore provide inaccurate rotational plane information.

Affixing a retro-reflector device directly to the wheel of the vehicle affords direct measurement of the actual rotational plane of the wheel to be tested. The present invention tracks a single point as it rotates about the true natural axis of the wheel to provide a true rotational plane measurement or depiction.

Figure 7:
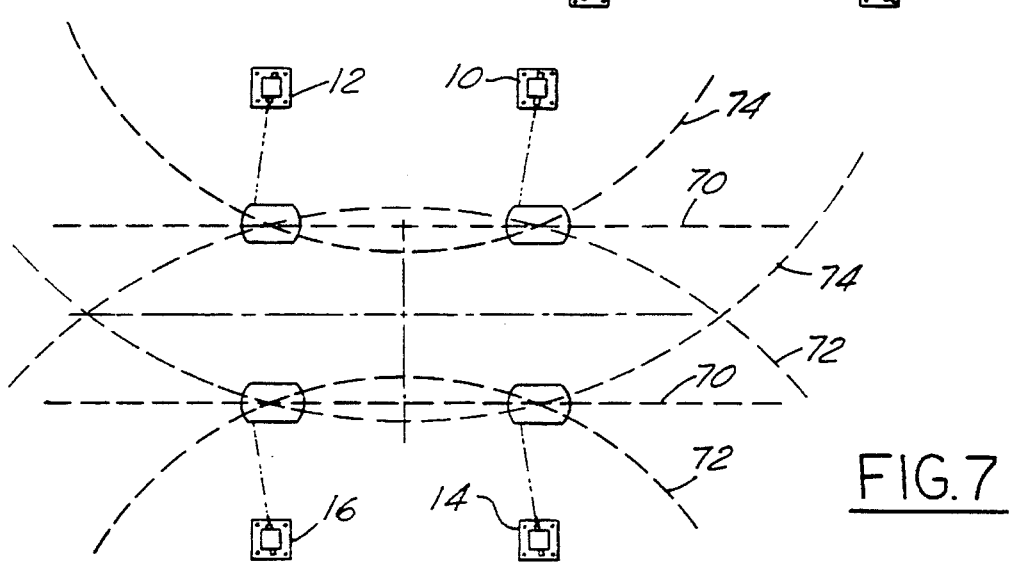
FIG. 7 is a diagrammatical view showing the laser tracking units following the respective wheels of the vehicle in a moving vehicle-type system.

Referring now to FIG. 7, attention is now turned to the method of the present invention wherein the vehicle is driven directly past the stationary laser tracking devices. This method is contemplated for use in service and repair stations for realigning and correction of various steering measurements. This method includes the identical steps described above with respect to the stationary measurement system except for the roller driven rotation of the wheels.

In the moving method of the present invention, after the retro-reflectors 30 have been affixed to each respective wheel, 20, 22, 24 and 26, the vehicle is driven past the laser tracking units in three paths. The first path, denoted by the reference numeral 70, indicates a generally straight line path. The second path, denoted by the reference numeral 72, indicates a generally curved path in one direction. The third path, denoted by the reference numeral 74, indicates a generally curved path, in a direction opposite the curved shape of path 72.

The laser tracking units 10, 12, 14, and 16, as in the stationary method, track the path of the retro-reflectors, and in effect the paths of each respective wheels 20, 22, 24 and 26. The movement of the vehicle 18 does not affect the ability of each of the laser tracking units and the system computer 48 from accurately generating the respective rotational plane of each respective wheel, as previously described above. The movement of the vehicle 18 in opposite curved directions following the paths 70, 72 and 74 and the simultaneous monitoring of the steering wheel level monitor 62 provides input necessary for calculating the steering wheel measurements discussed previously.

It is further contemplated by the present invention that the described method may also include variations related to the driving conditions of the vehicle. More specifically, it is contemplated that the present invention may be used to accurately determine the rotational planes of a vehicle while the vehicle is naturally loaded with passengers and/or cargo. For example, the vehicle to be tested may include passengers and standard cargo i.e. luggage, groceries and/or tools. With these loads, the vehicle may be run through the method of the present invention, either stationary or moving, and the rotational planes thereby determined. In this manner, steering and alignment measurements may be determined from a vehicle which is in a natural, common loaded, driving condition.

Additionally, the present invention may be used in conjunction with a laser tracking unit that is operatively connected to a moving track system or servo motor system wherein the laser tracking device follows the driving path of the vehicle to be tested. In this manner, the vehicle may be subjected to different terrain, driving conditions including simulated bumps, potholes, inclinations or declinations and accurate rotational planes may be determined under these conditions. These rotational planes may be used to determine steering and alignment measurements while the vehicle is subjected to different driving conditions.

While the best mode for carrying out the invention has been described in detail, those familiar with the art to which this invention relates will recognize various alternative designs and embodiments for practicing the invention as defined by the following claims.

What is claimed is:

1. A method for determining the actual rotational plane of at least two wheels of a vehicle in a common coordinate system, comprising the steps of:

positioning a first reflective device on a first wheel at any point on said first wheel offset from the central axis of rotation of said first wheel;

positioning a second reflective device on a second wheel at any point on said second wheel offset from the central axis of rotation of said second wheel;

rotating said first wheel about its central axis of rotation while the vehicle is in a natural loaded driving condition;

rotating said second wheel about its central axis of rotation while the vehicle is in a natural loaded driving condition;

tracking the position of said first and second reflective devices respectively in three dimensional space during the rotation of said first and second wheels by directing a light beam at said reflective device capable of accurately following the movement of said reflective device;

generating a first signal directly representative of the actual rotational plane of said first wheel; and generating a second signal directly representative of the actual rotational plane of said second wheel.

2. The method of claim 1 further comprising the step of comparing said first and second signals to an electronically stored mathematical model to determine the wheel alignment conditions of said first and second wheels in relation to each other and said mathematical model.

3. The method of claim 1 wherein said steps of rotating said first wheel and said second wheels are carried out simultaneously.

4. The method of claim 1 wherein said steps of rotating said first and second wheels comprises rotating both of said wheels less than a full rotation of 360°.

5. The method of claim 1 wherein said steps of rotating said first and second wheels affords at least two complete actual rotational plane measurements per rotation.

6. The method of claim 1 wherein the step of tracking said first and second reflective devices comprises the steps of:

providing a first and second laser tracking device each having a laser light emitter and a laser light receiver, said emitter adapted to follow the movement of a reflective device;

directing a laser light beam from said first laser tracking device at said first reflective device to produce a first redirected laser light beam;

directing a second laser light beam from said second laser tracking device at said second reflective device to produce a second redirected laser light beam;

receiving said first redirected laser light beam, at said laser light receiver of said first laser tracking device;

receiving said second redirected laser light beam, at said laser light receiver of said second laser tracking device;

moving said first laser light emitter in relation to said movement of said first redirected laser light beam such that said first laser light emitter follows the path of said reflective device affixed to said first wheel during rotation of said first wheel; and moving said second laser light emitter in relation to said movement of said second redirected laser light beam such that said laser light emitter follows the path of said reflective device affixed to said second wheel during rotation of said second wheel.

7. The method of claim 6 further comprising the step of calibrating said first and second laser tracking devices directly to the same coordinate system.

8. The method of claim 1 wherein said step of rotating said wheels comprises the step of activating a roller drive system for driving said wheels.

9. A method for determining the actual rotational plane of at least two wheels of a vehicle in a common coordinate system, comprising the steps of:

locating a first response member on a first of said wheels;

locating a second response member on a second of said wheels;

rotating said first wheel about its central axis of rotation while the vehicle is in a natural loaded driving condition;

rotating said second wheel about its central axis of rotation while the vehicle is in a natural loaded driving condition;

tracking the position of said first and second response members respectively in three dimensional space during the rotation of said first and second wheels by directing a light beam at said responsive member capable of accurately following the movement of said responsive member;

generating a first signal directly representative of the actual rotational plane of said first wheel; and generating a second signal directly representative of the actual rotational plane of said second wheel.

10. A method for determining the actual rotational plane of each of four wheels of a vehicle in a common coordinate system, comprising the steps of:

affixing a first reflective device to a first of said four wheels at any point on said first wheel offset from the central axis of rotation of said first wheel;

affixing a second reflective device to second of said four wheels at any point on said second wheel offset from the central axis of rotation of said second wheel;

affixing a third reflective device to a third of said four wheels at any point on said third wheel offset from the central axis of rotation of said third wheel;

affixing a fourth reflective device to fourth of said four wheels at any point on said fourth wheel offset from the central axis of rotation of said four wheel;

rotating said first, second, third and fourth wheels about each of their respective central axes of rotation while the vehicle is in a natural, loaded driving condition;

tracking the position of said first, second, third and fourth reflective devices respectively in three dimensional space during the rotation of said wheels by directing a light beam at each said respective reflective device capable of accurately following the movement of said respective reflective device;

generating a first signal directly representative of the actual rotational plane of said first wheel;

generating a second signal directly representative of the actual rotational plane of said second wheel;

generating a third signal directly representative of the actual rotational plane of said third wheel; and generating a fourth signal directly representative of the actual rotational plane of said fourth wheel.

11. The method of claim 10 further comprising the step of comparing said first, second, third and fourth signals to an electronically stored mathematical model to determine the wheel alignment conditions of each said first, second, third and fourth wheels in relation to each other and said mathematical model.

12. The method of claim 10 wherein said steps of rotating said wheels are carried out simultaneously.

13. The method of claim 10 wherein said steps of rotating wheels comprises rotating each of said wheels less than a full rotation.

14. The method of claim 10 wherein the step of tracking said first, second, third and fourth reflective devices comprises the steps of:

provideing a first, second, third and fourth laser tracking device each having a laser light emitter adapted to follow the movement of a reflective device and a laser light receiver;

directing a laser light beam from each of said first, second, third and fourth laser tracking devices at said respective first, second, third and fourth reflective devices to produce a first, second, third and fourth redirected laser light beam;

receiving said first redirected laser light beam, at said laser light receiver of said first laser tracking device;

receiving said second redirected laser light beam, at said laser light receiver of said second laser tracking device;

receiving said third redirected laser light beam, at said laser light receiver of said third laser tracking device.;

receiving said fourth redirected laser light beam, at said laser light receiver of said fourth laser tracking device;

moving said first laser light emitter in relation to said movement of said first redirected laser light beam such that said first laser light emitter follows the path of said reflective device affixed to said first wheel during rotation of said first wheel; and moving said second laser light emitter in relation to said movement of said second redirected laser light beam such that said laser light emitter follows the path of said reflective device affixed to said second wheel during rotation of said second wheel;

moving said third laser light emitter in relation to said movement of said third redirected laser light beam such that third laser light emitter follows the path of said reflective device affixed to said third wheel during rotation of said third wheel; and moving said fourth light emitter in relation to said movement of said fourth redirected laser light beam such that said laser light emitter follows the path of said reflective device affixed to said fourth wheel during rotation of said fourth wheel.

15. The method of claim 10 further comprising the step of calibrating each of said first, second, third and fourth laser tracking devices directly to the same coordinate system.

16. The method of claim 10 wherein said step of rotating said wheels comprises the step of activating a roller drive system for driving said wheels.

17. A method for determining the actual rotational plane of at least two wheels of a vehicle in a common coordinate system, comprising the steps of:

affixing a first reflective device to a first of said at least two wheels at any point on said wheel offset from the central axis of rotation of said first wheel;

affixing a second reflective device to second of said at least two wheels at any point on said other wheel offset from the central axis of rotation of said second wheel;

rotating said first wheel about its central axis of rotation by driving the vehicle in any natural loaded driving condition;

rotating said second wheel about its central axis of rotation by driving the vehicle in any natural loaded driving condition;

tracking the position of said first and second reflective devices respectively in three dimensional space by directing a light beam at said reflective device capable of accurately following the movement of said reflective device;

generating a first signal directly representative of the actual rotational plane of said first wheel; and generating a second signal directly representative of the actual rotational plane of said second wheel.

18. The method of claim 17 further comprising the step of comparing said first and second signals to a electronically stored mathematical model to determine the wheel alignment conditions of said first and second wheels in relation to each other and said mathematical model.

19. The method of claim 17 wherein said steps of rotating said first wheel and said second wheels are carried out simultaneously.

20. The method of claim 17 wherein the step of tracking said first and second reflective devices comprises the steps of:

providing a first and second laser tracking device each having a laser light emitter adapted to follow the movement of a reflective device and a laser light receiver;

directing a laser light beam from said first laser tracking device at said first reflective device to produce a first redirected laser light beam;

directing a second laser light beam from said second laser tracking device at said second reflective device to produce a second redirected laser light beam;

receiving said first redirected laser light beam, at said laser light receiver of said first laser tracking device;

receiving said second redirected laser light beam, at said laser light receiver of said second laser tracking device;

moving said first laser light emitter in relation to said movement of said first redirected laser light beam such that said first laser light emitter follows the path of said reflective device affixed to said first wheel during rotation of said first wheel; and moving said second laser light emitter in relation to said movement of said second redirected laser light beam such that said laser light emitter follows the path of said reflective device affixed to said second wheel during rotation of said second wheel.

21. The method of claim 17 further comprising the step of calibrating said first and second laser tracking devices directly to the same coordinate system.

22. The method of claim 17 wherein further comprising the steps of:

driving the vehicle in a straight line path;

driving the vehicle in a right curve path; and driving the vehicle in a left curve path.

23. An apparatus for measuring the natural rotational plane of a wheel comprising:

a reflective device affixable to said wheel;

a laser tracking device adapted to track the movements of said reflective device in three dimensional space while the wheel is in a natural loaded driving condition during the rotation of said wheel and generating a signal directly representative of the actual rotational plane of said wheel; and a processor for receiving said signal and comparing said signal to a electronically stored mathematical model to determine wheel alignment conditions.

24. The apparatus of claim 23 wherein said reflective device is integral with said wheel.

25. The apparatus of claim 23 wherein said reflective device is insert molded within said wheel.

26. The apparatus of claim 23 wherein reflective device is affixed to a lug nut.

27. The apparatus of claim 23 wherein the reflective device is integral with a lug nut thereby cooperating with the design of said wheel.

* * * * *

UNITED STATES PATENT AND TRADEMARK OFFICE
CERTIFICATE OF CORRECTION

PATENT NO. : 5,532,816
DATED : July 2, 1996
INVENTOR(S) : Spann et al.

It is certified that error appears in the above-identified patent and that said Letters Patent is hereby corrected as shown below:

Column 5, line 46, after "preferred embodiment," insert the word -- is --;

Column 5, line 48, "." appearing before Figure 1 should be deleted;

Column 10, line 38, "four" should be replaced with -- fourth --;

Column 11, line 25, delete the word -- and --;

Column 12, line 4, replace "a" with -- an --.

Signed and Sealed this

Fourth Day of February, 1997

Attest:

BRUCE LEHMAN

*Attesting Officer*   *Commissioner of Patents and Trademarks*